United States Patent
Wilmo et al.

(10) Patent No.: US 7,073,661 B2
(45) Date of Patent: Jul. 11, 2006

(54) SELF CLEANING CONVEYOR WITH ROLLER SCRAPER AND DEBRIS REDUCTION SKIRT

(75) Inventors: Michael Steward Wilmo, Crystal, MN (US); Joseph Kenneth Krueger, Plymouth, MN (US)

(73) Assignee: Tennant, Minneapolis, MN (US)

( * ) Notice: Subject to any disclaimer, the term of this patent is extended or adjusted under 35 U.S.C. 154(b) by 0 days.

(21) Appl. No.: 10/793,584

(22) Filed: Mar. 4, 2004

(65) Prior Publication Data

US 2005/0194235 A1 Sep. 8, 2005

(51) Int. Cl.
*B65G 15/62* (2006.01)
(52) U.S. Cl. .............. 198/841; 198/818; 198/198; 198/497; 198/495
(58) Field of Classification Search .......... 198/851, 198/494, 495, 497, 818, 823, 836.1, 836.3, 198/836.4, 837, 841
See application file for complete search history.

(56) References Cited

U.S. PATENT DOCUMENTS

| | | | |
|---|---|---|---|
| 1,791,482 A * | 2/1931 | Thomas | 198/497 |
| 1,933,485 A * | 10/1933 | Rund et al. | 198/499 |
| 2,227,776 A * | 1/1941 | Anderson | 198/497 |
| 2,731,138 A * | 1/1956 | Parisi | 198/823 |
| 2,964,855 A * | 12/1960 | Fava | 34/203 |
| 3,008,542 A | 11/1961 | Steele | |
| 3,556,286 A * | 1/1971 | Ryunosuke et al. | 198/823 |
| 3,604,051 A | 9/1971 | Wendel et al. | |
| 3,639,940 A | 2/1972 | Carlson et al. | |
| 3,756,416 A | 9/1973 | Wood | |
| 3,792,569 A | 2/1974 | Carlson et al. | |
| 3,865,232 A | 2/1975 | Koenig, et al. | |
| 3,881,215 A | 5/1975 | Krier et al. | |
| 3,926,596 A | 12/1975 | Coleman | |
| 4,017,281 A | 4/1977 | Johnstone | |
| 4,067,318 A * | 1/1978 | Flaith et al. | 34/208 |
| 4,578,840 A | 4/1986 | Pausch | |
| 4,660,248 A | 4/1987 | Young | |
| 4,754,521 A | 7/1988 | Zoni | |
| 4,759,781 A | 7/1988 | Olson | |
| 4,789,056 A * | 12/1988 | Bourbeau | 198/823 |
| 4,854,443 A | 8/1989 | Gordon | |
| 4,878,576 A * | 11/1989 | Dietzen | 198/494 |
| 4,944,386 A | 7/1990 | Swinderman | |
| 5,006,136 A | 4/1991 | Wetter | |
| 5,219,064 A * | 6/1993 | Roman | 198/836.1 |

(Continued)

FOREIGN PATENT DOCUMENTS

DE  1256241  12/1967

(Continued)

*Primary Examiner*—Gene O. Crawford
*Assistant Examiner*—Mark A. Deuble
(74) *Attorney, Agent, or Firm*—Altera Law Group, LLC

(57) ABSTRACT

Disclosed herein is a method and apparatus for a street sweeper having a conveyor assembly. The conveyor assembly has a pair of rollers and a conveyor belt connected therebetween. The conveyor assembly is provided with debris skirts to lift the edge of the conveyor belt to prevent debris from traveling over the edge of the conveyor belt. The conveyor belt is formed into a concave orientation. The debris skirts is also connected to a rub rail to provide a dynamic seal along the length of the conveyor belt edges. The conveyor assembly is also provided with a roller scraper for removing debris accumulated upon the rollers. The roller scraper is adapted to envelop a portion of the roller. The conveyor assembly is also provided with a liquid delivery system for assisting in the removal of debris from the roller.

11 Claims, 12 Drawing Sheets

U.S. PATENT DOCUMENTS

| | | |
|---|---|---|
| 5,725,083 A | 3/1998 | Archer |
| 5,915,527 A * | 6/1999 | Nakamura ............... 198/861.1 |
| 5,931,280 A | 8/1999 | Nissen |
| 5,975,281 A | 11/1999 | Yoshizako et al. |
| 6,192,542 B1 | 2/2001 | Frederick et al. |
| 6,195,836 B1 | 3/2001 | Vanderlinden |
| 6,195,837 B1 | 3/2001 | Vanderlinden |
| 6,481,562 B1 | 11/2002 | Randerson |
| 6,581,754 B1 | 6/2003 | Law |
| 6,619,469 B1 | 9/2003 | Malmberg |
| 6,695,123 B1 | 2/2004 | Stoll |
| 6,820,734 B1 | 11/2004 | Gilbert et al. |

FOREIGN PATENT DOCUMENTS

| | | |
|---|---|---|
| DE | 1256242 | 12/1967 |
| EP | 0453177 | 4/1991 |
| GB | 2150904 A * | 7/1985 |
| WO | 03/069071 | 2/2003 |

* cited by examiner

SELF CLEANING CONVEYOR WITH ROLLER SCRAPER AND DEBRIS REDUCTION SKIRT

BACKGROUND OF THE INVENTION

1. Field of the Invention

The present invention relates to a conveyor belt debris removal system most commonly on street and floor sweepers though other applications where particles are transported would be applicable. The conveyor belt debris removal system may be provided with an apparatus configured to form the belt into a particular shape along at least a portion of the run of the conveyor belt. The conveyor belt debris removal system may also be provided with a cleaning mechanism for removing debris from a conveyor belt roller disposed at ends of the conveyor belt apparatus.

2. Background

Street sweepers are a common necessity to maintaining the safety and beauty of streets and highways throughout the world. Street sweepers come in a variety of shapes and sizes for a variety of different functions. Some surfaces must be maintained meticulously clean for safety purposes, such as airport runways, taxi-ways, and helicopter landing strips. Other surfaces require cleaning to prevent flooding, such as sweeping the leaves from highways and streets to prevent ditches, culverts and storm drains from becoming clogged and preventing the runoff of snow melt and storm water.

In small towns and suburban neighborhoods, small, quiet, dust-less, and pollution free street sweepers are demanded. In order to provide a more efficient and durable street sweeper, a conveyor belt debris removal apparatus may be applied to convey the debris from the surface being cleaned to a debris collection bin in the street sweeper assembly. Conveyor belt debris removal systems suffer a drawback because of the flexible nature of the rubber or plastic conveyor belts.

During debris collection and removal, the conveyor belt may vibrate. The vibrations may cause debris to travel to the edges of the conveyor belt and fall into the interior space between the upper and lower revolving conveyor belts. The debris may then travel to the ends of the conveyor belt assembly and become attached to the rollers disposed at the ends of the conveyor assembly. The debris interferes with the rollers' frictional interaction with the conveyor belt causing the conveyor belt to stretch and slip over the rollers. The debris attached to the rollers causes increases wear on the debris removal system and may cause a catastrophic malfunction of the system.

In a conveyor belt debris removal system, tension must be maintained in the belt at all times, otherwise the belt will slip and be prevented from rolling as the drive roller turns causing the operation of the conveyor to be impeded or ultimately fail.

It can be seen that there is a need for a conveyor belt debris removal system provided with an apparatus configured to form the belt into a particular shape along at least a portion of the run of the conveyor belt to prevent debris from falling off the conveyor belt and damaging the debris removal system. It can also be seen that there is a need for a cleaning mechanism for removing debris from a conveyor belt roller disposed at ends of the conveyor belt apparatus to ensure that tension is maintained in the conveyor belt so that the frictional engagement between the rollers and the conveyor belt remains optimized.

By implementing this invention, the conveyor is able to operate for longer periods of time with less maintenance. The present invention fulfills these and other needs, and addresses other deficiencies of prior art implementations.

SUMMARY OF THE INVENTION

To overcome the limitations in the prior art described above, and to overcome other limitations that will become apparent upon reading and understanding the present specification, the present invention discloses a conveyor belt debris removal system. The conveyor belt debris removal system may be provided with an apparatus configured to form the belt into a particular shape along at least a portion of the run of the conveyor belt.

The conveyor belt debris removal system may also be provided with a cleaning mechanism for removing debris from a conveyor belt roller disposed at ends of the conveyor belt apparatus.

An apparatus in accordance with the principles of the present invention may include a street sweeper including a conveyor assembly. The conveyor assembly includes a first driving roller and a second roller mounted on an axle. The second roller has an associated bearing assembly at each end of the axle. The apparatus also includes a conveyor belt having opposing edges. The belt is operatively connected to the first driving roller and the second roller. The apparatus also includes at least one debris skirt associated with an edge of the conveyor belt. The debris skirt is positioned to lift the edge of the conveyor belt, thereby causing the conveyor belt to follow a concave orientation.

Other embodiments of a system in accordance with the principles of the invention may include alternative or optional additional aspects. One such additional aspect of the present invention is that the at least one debris skirt includes a pair of debris skirts. Each debris skirt is associated with opposing edges of the conveyor belt adjacent to the second roller.

Another aspect of the present invention is that each debris skirt includes an extension flange substantially covering at least part of the ends of the axle and the associated bearing assemblies.

Another aspect of the present invention is that the street sweeper also includes a rub rail associated with each debris skirt. The debris skirt and associated rub rail cooperatively form a dynamic seal with the conveyor belt along the edges of the conveyor belt and cooperatively lift the conveyor belt edges along a length of the conveyor belt forming the conveyor belt concave shape.

Another aspect of the present invention is that the rub rail and the debris skirt are associated via a mitered joint.

Another aspect of the present invention is that the street sweeper also includes a roller scraper associated with the second roller. The roller scraper envelops at least a portion of the second roller.

Another aspect of the present invention is that the roller scraper includes a scraping surface spaced a predetermined distance from a surface of the second roller along an entire extent of the second roller.

Another aspect of the present invention is that at least the second roller is crowned at a center point of the roller and the roller scraper includes a centrally located ridge associated with the crowned center point of the second roller.

Another aspect of the present invention is that the roller scraper also includes a pair of sloping sides extending from the ridge to outer edges of the roller scraper and following a rollout of the second roller to direct debris away from the second roller and the conveyor belt.

Another aspect of the present invention is that the street sweeper also includes a liquid delivery assembly associated with the second roller and the roller scraper. The liquid delivery assembly includes at least one hose, at least one spout, and at least one nozzle associated with each at least one spout.

Another apparatus in accordance with the principles of the present invention may include a conveyor assembly including a roller mounted on an axle and having an associated bearing assembly at each end of the axle. The conveyor assembly also includes conveyor belt operatively connected to the roller and a pair of debris skirts associated with each edge of the conveyor belt. The debris skirts lift the edge of the conveyor belt forming the conveyor belt into a concave orientation.

Another aspect of the present invention is that the debris skirts also include an extension flange substantially covering the ends of the axle and the associated bearing assemblies.

Another aspect of the present invention is that the conveyor assembly also includes a rub rail associated with each debris skirt. The debris skirts and associated rub rails cooperatively form a dynamic seal with the conveyor belt along the edges of the conveyor belt and cooperatively lift the conveyor belt edges along a length of the conveyor belt forming the conveyor belt concave orientation.

Another aspect of the present invention is that the rub rail and the debris skirt are associated via a mitered connection.

Another aspect of the present invention is that the conveyor assembly also includes a roller scraper associated with the roller. The roller scraper envelops at least a portion of the roller.

Another aspect of the present invention is that the roller scraper also includes a scraping surface spaced a predetermined distance from a surface of the roller along an entire extent of the roller.

Another aspect of the present invention is that the roller is crowned at a center point of the roller. The roller scraper also includes a centrally located ridge associated with the crowned center point of the roller.

Another aspect of the present invention is that the roller scraper also includes a pair of sloping sides extending from the ridge to outer edges of the roller scraper and following a rollout of the roller to direct debris away from the roller and the conveyor belt.

Another aspect of the present invention is that the conveyor assembly also includes a liquid delivery assembly associated with the roller and the roller scraper. The liquid delivery assembly includes at least one hose, at least one spout, and at least one nozzle associated with each at least one spout.

Another apparatus in accordance with the principles of the present invention may also include a debris skirt. The debris skirt may include at least one connector disposed along a side of the skirt. The debris skirt may also include an extension flange disposed along a first end. The debris skirt may also include a mitered section disposed at a second end and a convex central portion. The skirt is adapted to lift an edge of a conveyor belt and provide a dynamic seal between the belt and the skirt.

Another aspect of the present invention is that the debris skirt is adapted to be connected to a rub rail at the mitered section. The skirt and rub rail cooperatively lift the edge of the conveyor belt and provide a dynamic seal between the skirt and rub rail along a length of the conveyor belt.

A method in accordance with the principles of the present invention may also include a method of preventing debris from traveling over an edge of a conveyor belt. The method may include lifting the peripheral edges of the belt and abutting a flange into engagement with a bottom edge of the conveyor belt such that the edge of the conveyor belt is lifted into a concave orientation directing a flow of debris from the flange to a place away from the belt. Debris is directed toward a center of the conveyor belt and prevented from traveling over the edge of the conveyor belt. A flange abutment prevents debris from being associated with the underside surface of the belt.

Another aspect of the present invention may also include connecting a rub rail extension to an end of the skirt via a mitered connection and forming a dynamic seal between the connected skirt and rub rail and the conveyor belt along a length of the conveyor belt.

Another method in accordance with the principles of the present invention may also include a method of removing debris from a roller. The method may include scraping the surface of a roller such that a scraping surface of a scraper maintains a predetermined spacing from the roller. The method may also include enveloping at least a portion of the roller within the scraper and scraping debris from the roller along and entire length of the roller at plural locations about a circumference of the roller.

Another aspect of the present invention may also include directing scraped debris away from a center of the roller and toward ends of the roller and preventing scraped debris from being reattached to the roller.

Another apparatus in accordance with the principles of the present invention may also include a roller scraper for scraping a crowned roller. The apparatus may include a centrally located ridge having a ridge width and a pair of sides meeting at the ridge and sloping away from the ridge. Each of the sides may be provided with a scraping surface for removing debris attached to the roller. Each of the sides has an end having an end width and a center having a center width. The end width is greater than the ridge width and the ridge width is greater than the center width.

Another aspect of the present invention may also include that the roller scraper receives a portion of the roller into a portion of the roller scraper.

Another aspect of the present invention may also include that the crowned roller has an end diameter at ends of the roller and a crown diameter at a center point of the roller. The crown diameter is greater than the end diameter. The ridge of the roller scraper is associated with the center point of the roller and the ends of the sides of the scraper are associated with the ends of the roller.

Another aspect of the present invention may also include scraping surfaces following an arcuate curvature corresponding to a path of traverse across a surface of the roller.

Another aspect of the present invention may also include that the roller scraper is generally chevron shaped in cross-section.

Another aspect of the present invention may also include that the scraping surfaces selected from smooth edge surfaces and serrated edges surfaces following a scalloped curvature about each sloping side of the scraper.

The foregoing objects, advantages and distinctions of the invention, among others, are obtained in a presently preferred construction that provides a street sweeper having a conveyor belt debris removal system. The conveyor belt debris removal system may be provided with an apparatus configured to form the belt into a particular shape along at least a portion of the run of the conveyor belt. The conveyor belt debris removal system may also be provided with a cleaning mechanism for removing debris from a conveyor belt roller disposed at ends of the conveyor belt apparatus. The foregoing features may be inventions alone or in combination.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

Figure 1:
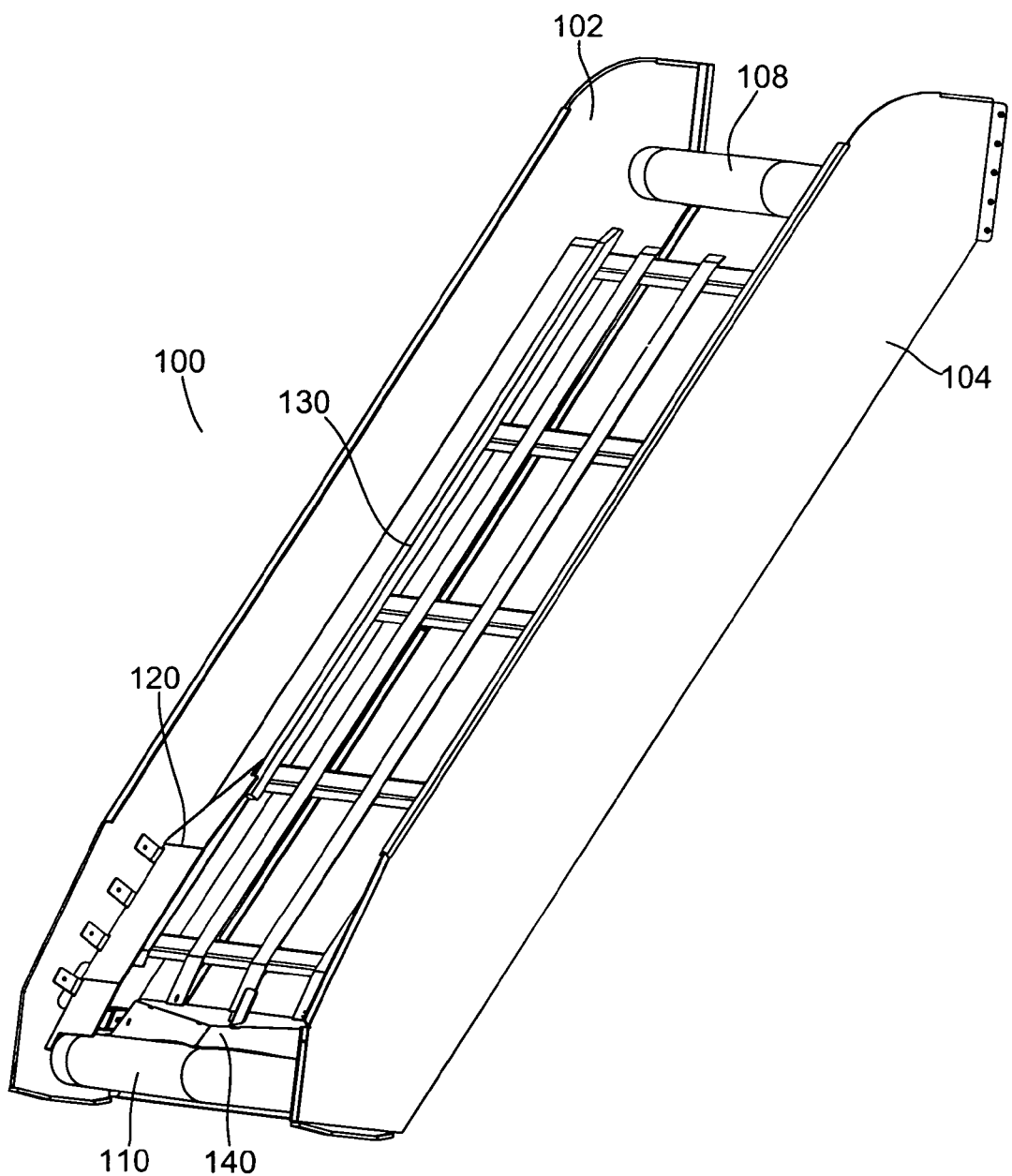
FIG. 1 illustrates a conveyor assembly with the conveyor belt removed according to an embodiment of the present invention.

While the invention is amenable to various modifications and alternative forms, specifics thereof have been shown by way of example in the drawings and will be described in detail herein. It is to be understood, however, that the intention is not limited to the invention shown in the particular embodiments described. On the contrary, the invention is intended to cover all modifications, equivalents, and alternatives falling within the scope of the invention as defined by the claims appended hereto.

DETAILED DESCRIPTION OF THE INVENTION

In the following description of the illustrated embodiments, reference is made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

The present invention provides a street sweeper having a conveyor belt debris removal system. The debris removal system may be provided with a apparatus configured to form the belt into a particular shape along at least a portion of the run of the conveyor belt. The debris removal system may also be provided with a cleaning mechanism for removing debris from a conveyor roller disposed at ends of the conveyor assembly.

The present invention discloses street sweepers using a conveyor belt to transport material. The invention may include at least one debris skirt installed adjacent the lower roller of the conveyor assembly and adjacent the conveyor belt edges to prevent debris deposited upon the conveyor belt by the main broom from becoming associated with the lower roller of the conveyor assembly. The debris skirt may be a panel which provides a seal between the conveyor belt and the sides of the conveyor assembly. The debris skirt receives a lot of wear by virtue of its engagement with the conveyor belt while preventing wear on other components of the conveyor assembly.

The conveyor assembly may also be provided with a rub rail disposed on a top face of the conveyor assembly. At least one rub rail may be installed where an outer edge of the conveyor belt rides upon the conveyor assembly. The rub rail may also be considered a replaceable wear item along with the debris skirts. The rub rails are adapted to perform at least the following two functions. The rub rails may be adapted to force the conveyor belt to bend into a concave shape wherein the conveyor belt is forced into a position where the middle portion is disposed lower than the outer edge portions of the conveyor belt. In this manner, the debris may become centralized in the central portion of the conveyor belt to prevent the debris from falling over the outer edges of the conveyor belt and damaging other components of the debris removal system. The rub rail also provides a dynamic seal between the conveyor belt and the conveyor assembly preventing debris from being deposited under the conveyor belt and becoming associated with the lower roller.

The rub rail and the debris skirt may also be adapted to cooperatively function to prevent debris from falling from the conveyor belt and becoming associated with the lower roller. The debris skirt may be disposed in close proximity to the roller at an end of the conveyor assembly to initiate the bending of the conveyor belt by lifting the outer edges of the conveyor. The rub rail may be disposed adjacent to the distal end of the debris skirt through a mitered connection to continue and maintain the concave curvature of the conveyor belt along the length of the conveyor assembly. In this fashion, the debris skirt and rub rail lift the conveyor belt's outer edge forcing the belt into a concave shape and preventing debris from falling over the edge of the belt.

Unfortunately, debris may still arrive beneath the conveyor belt and come into contact with the rollers. Some debris may be fine airborne particles, such as, dust, soot, or road treatment chemicals which through a process similar to condensation may become attached to the rollers of the conveyor assembly underneath the conveyor belt. Eventually, a significant number of particles will become attached to the rollers, causing the belt to slip and/or stretch. Further, the accumulated debris on the rollers may cause the drive system to work harder requiring more fuel to power the conveyor assembly. The belt may also begin to be warped and drift toward the edges of the conveyor side walls increasing the wear on both the conveyor belt and the conveyor guide structures.

It is necessary to remove the debris from the rollers before any damage or unnecessary wear can occur. The present invention provides a roller scraper adapted to remove debris from the rollers. The roller scraper is also adapted to cause the debris to be directed away from the center portion of the rollers toward the outer edges of the rollers. The present invention provides a roller scraper adapted to envelop at least a portion of the roller placing a scraping edge a predetermined distance from the roller along the length of the scraper. The scraper roller is adapted to take advantage of gravity in removing and directing the debris away from the center of the roller by being provided with a high central point proximate the center of the roller which slopes downwardly away from the center toward both edges of the roller while yet maintaining the spacing distance between the roller scraper and the roller.

FIG. 1 illustrates a conveyor assembly 100 with the conveyor belt removed according to an embodiment of the present invention. In FIG. 1, the conveyor assembly 100 is shown having two sidewalls 102 and 104 and a pair of crowned rollers 108 and 110, though only one roller may be crowned. Ordinarily, one roller 108 is a drive roller causing the conveyor belt to rotate and the other roller 110 is a free roller, however, both or either of the rollers 108 and 110 may be driven, if desirable. The conveyor assembly 100 is also provided with a debris skirt 120 and an associated rub rail 130 which are adapted to raise and bend the edge of the conveyor belt causing the belt to take a generally concave shape. The conveyor assembly 100 is also provided with a roller scraper 140 placed in a close and generally enveloping configuration adjacent roller 110 to remove accumulated debris from the roller 110.

Figure 2:
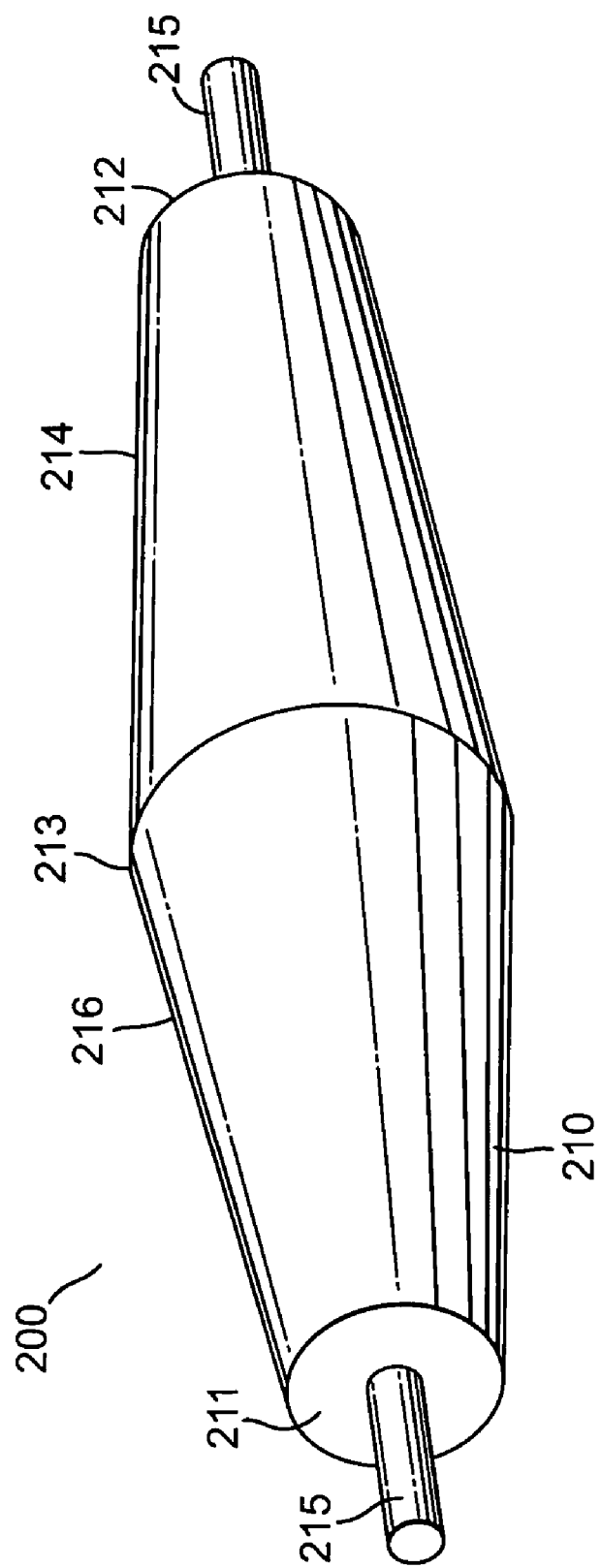
FIG. 2 illustrates a crowned roller according to an embodiment of the present invention.

FIG. 2 illustrates a perspective view 100 of a crowned roller 210 according to an embodiment of the present invention. In FIG. 2, the roller 210 is shown disposed on an axle 215 at respective ends 211 and 212 of the roller 210. The axle establishes a longitudinal axis of rotation for the roller lying in a horizontal plane parallel to the plane of the conveyor belt. The roller is shown crowned at a center point 213 of the roller 210 and have sloped portion 216 and 214 sloping from the center point 213 out to the ends 211 and 212. The crowning is typically between 0.15 to 0.75 inches, that is, the central crowned portion of the roller is had an outside diameter between 0.15 to 0.75 inches larger than the outside diameter of the roller ends. The roller, for example may be approximately 25 inches in length and have a central crowned portion having an outside diameter of 0.375 larger than the diameter of the roller ends. Providing the roller 210 being crowned, as shown in FIG. 2, maintains the conveyor belt located centrally on the roller 210 and prevents the roller from shifting toward either of the ends 211, 212 of the roller 210. However, the conveyor belt and roller 210 relationship is adversely affected by accumulation of debris on the roller 210 which will change the shape of the roller and cause the belt to slip or shift toward an end of the roller. As debris accumulates on the roller, the diameter of the roller changes causing the belt to become distended and shifting the belt out of the desired orientation.

Figure 3:
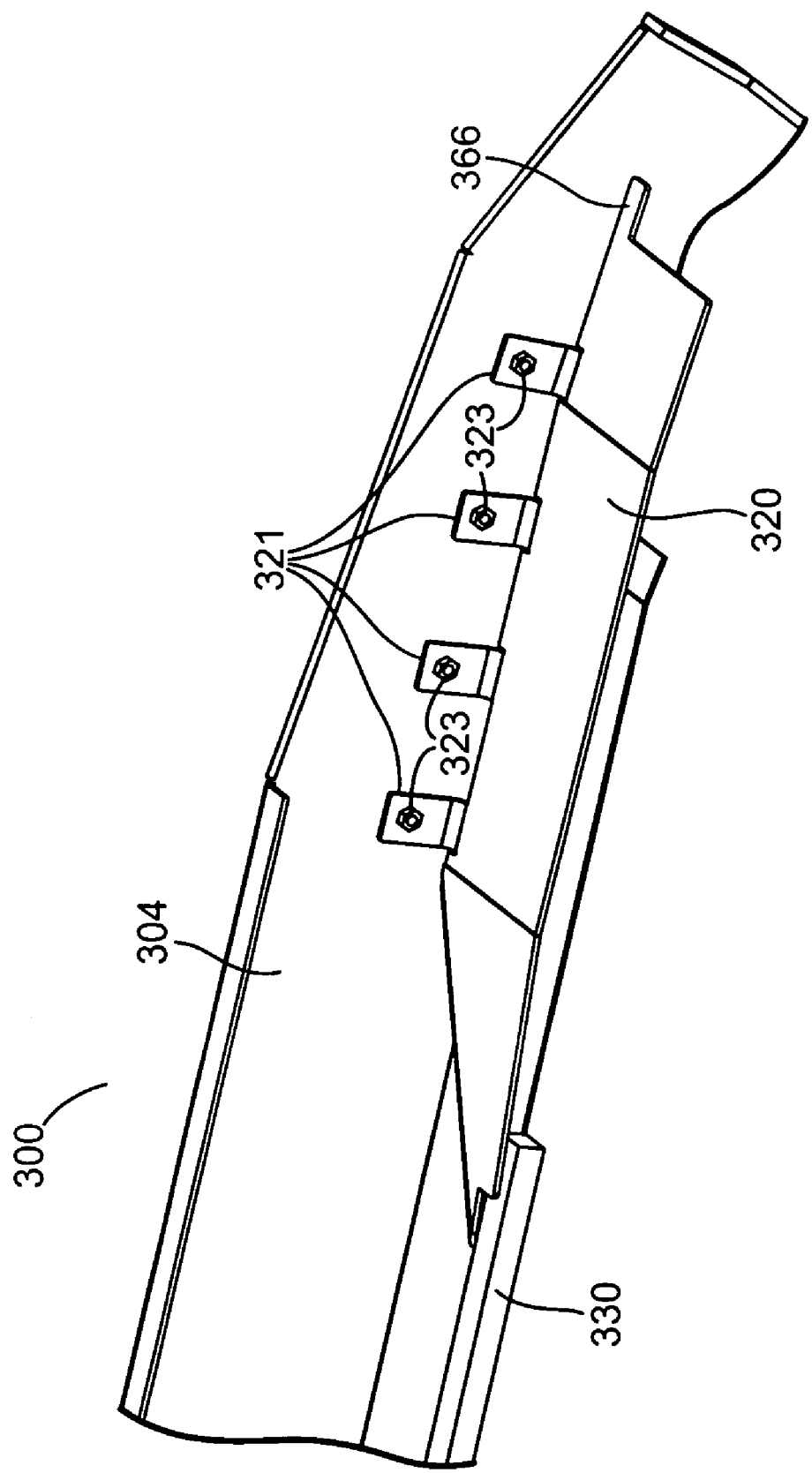
FIG. 3 illustrates a debris skirt and rub rail according to an embodiment of the present invention.

FIG. 3 is a perspective view 300 illustrating a debris skirt 320 and a rub rail 330 connected to an interior sidewall 304 of the conveyor assembly according to an embodiment of the present invention. The debris skirt 320 is provided with a plurality of brackets 321 and bolts 323 to secure connect the debris skirt 320 to the sidewall 304. The debris skirt 320 is provided with an extension flange 366 which at least partially covers the junction of the roller axle and bearing (not shown in this figure) where the axle is joined to the sidewall. The extension flange 366 prevents debris from becoming associated with the axle and bearing interface ensuring that the roller is free to rotate.

The debris skirt 320 is also associated with a rub rail 330 which may be placed adjacent one another via a mitered joint as shown in FIG. 3. The debris skirt 320 and rub rail 330 cause the conveyor belt to be lifted above the central portion of the conveyor belt directing debris toward the center of the belt and away from the edge of the belt. In this manner, the debris is more effectively conveyed to a debris collection hopper in the street sweeper. The debris is also prevented from falling over the edge of the conveyor belt preventing the debris from accumulating on the opposite surface of the belt or on the rollers which would adversely affect the operation of the conveyor assembly.

The debris skirt 320 and rub rail 330 also prevent the conveyor belt from shifting from side to side and detrimentally interacting with the sidewalls of the conveyor assembly. The debris skirt 320 and rub rail 330 receive the wear instead of the sidewalls and are adapted to be easily removed and replaced when excessively worn or damaged. The debris skirt may be sloped downwardly and beneath the edge of the conveyor belt or may be provided with a convex surface to provide a better seal between the debris skirt 320 and the conveyor belt. Together the rub rail 330 and the debris skirt form a dynamic seal between the moving conveyor belt and the skirt and rail.

Figure 4:
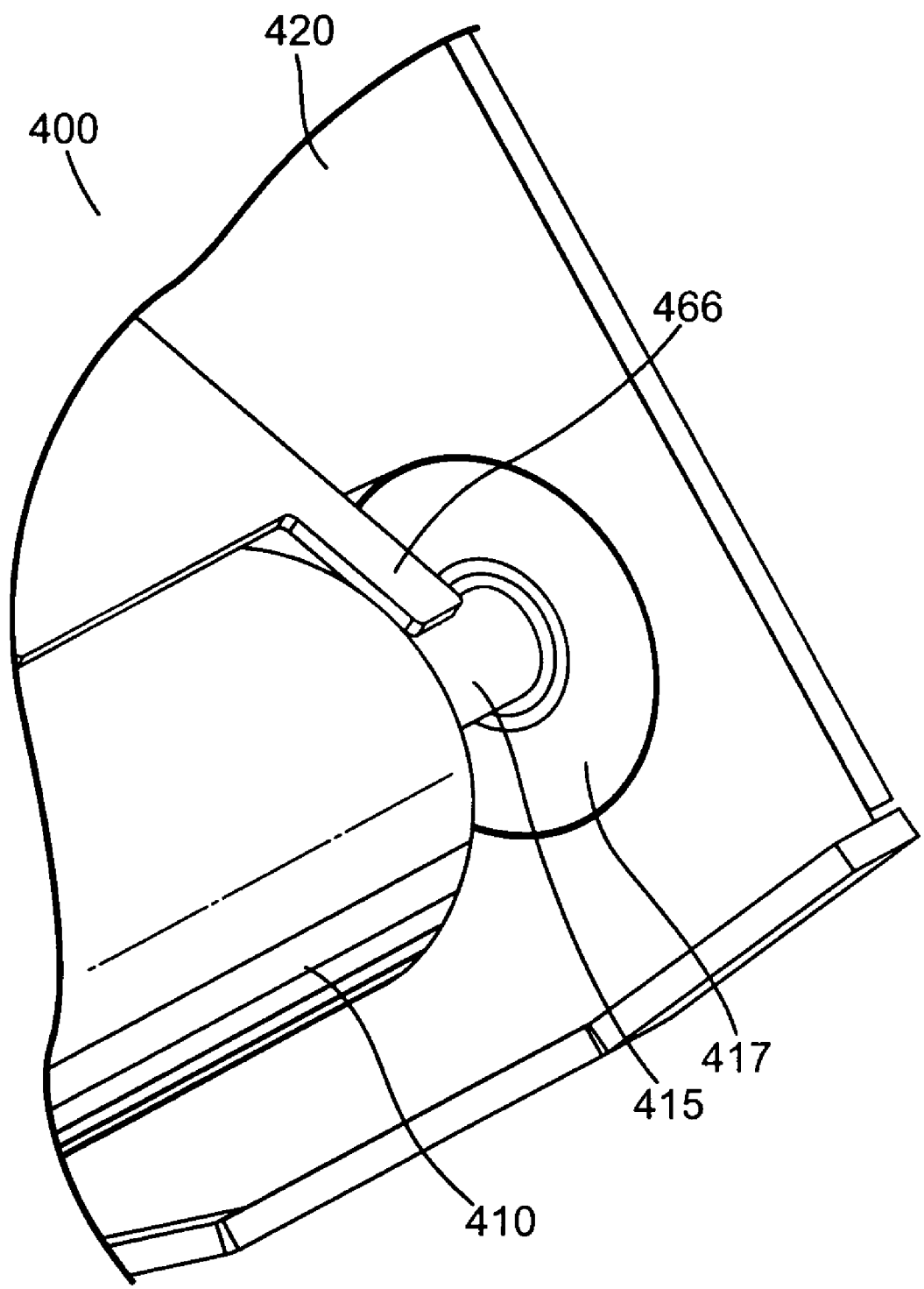
FIG. 4 illustrates a protective flange extension of the debris skirt according to an embodiment of the present invention.

FIG. 4 is a close-up view 400 illustrating the protective extension flange 466 of the debris skirt 420 according to an embodiment of the present invention. In FIG. 4, the extension flange 466 is shown substantially covering the interface between the roller 410, the axle 415, and the axle bearing 417 to prevent debris from becoming associated with moving components of the conveyor assembly.

Figure 5:
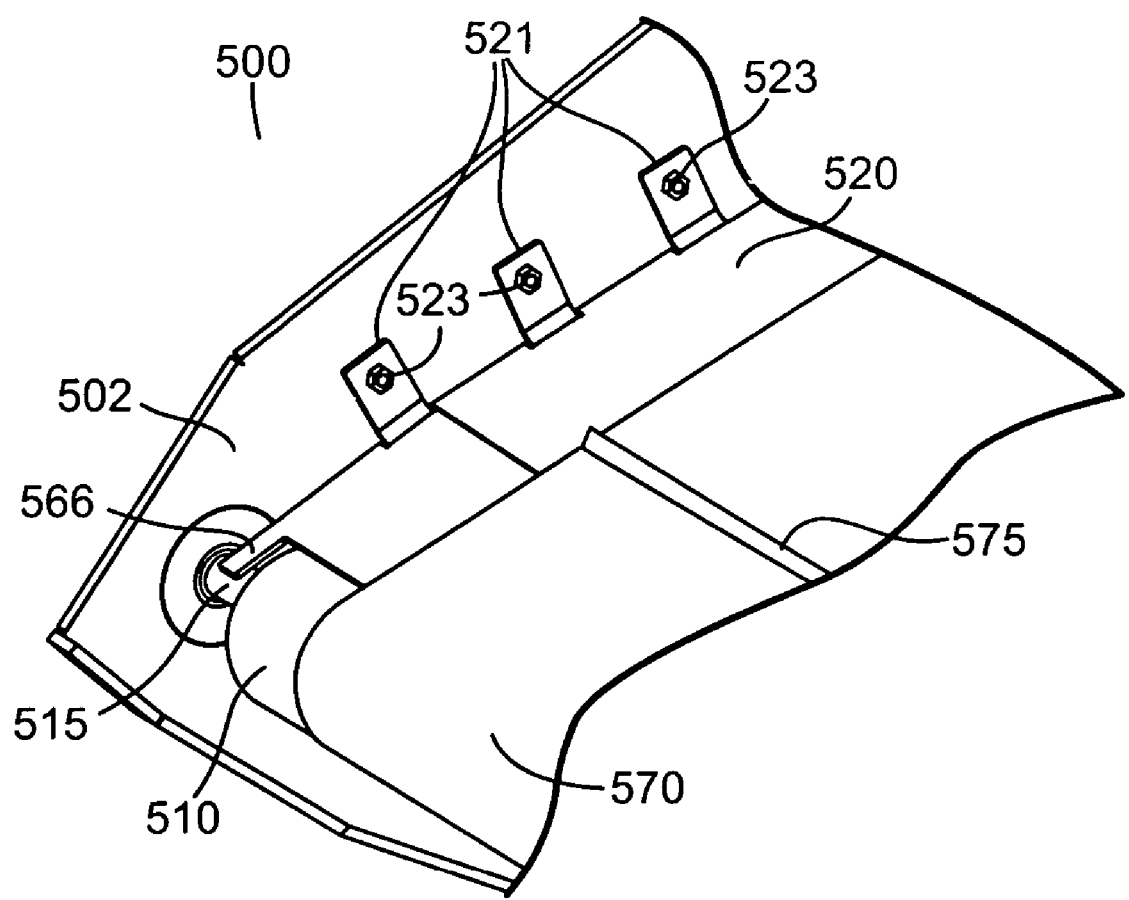
FIG. 5 illustrates the relationship between the debris skirt, roller, and conveyor belt from above according to an embodiment of the present invention.

FIG. 5 is a close-up perspective view 500 illustrating the relationship between the debris skirt 520, roller 510, and conveyor belt 570 from above according to an embodiment of the present invention. In FIG. 5, the debris skirt 520 is shown bolted to the sidewall 502 with brackets 521 and bolts 523. The debris skirt 520 is shown disposed beneath the edge of the conveyor belt 570 to lift the edge of the belt 570 forcing the belt into a concave curvature. The debris skirt 520 is shown provided with an extension flange 566 covering the axle 515 on which the roller 510 rotates. The conveyor belt 570 is shown provided with a flight or cleat 575 across the width thereof. The flight 575 on the belt 570 acts to scoop the debris as the conveyor belt rolls and elevates the debris. The conveyor belt may be fabricated from an ultra-high molecular weight rubber or plastic.

Figure 6:
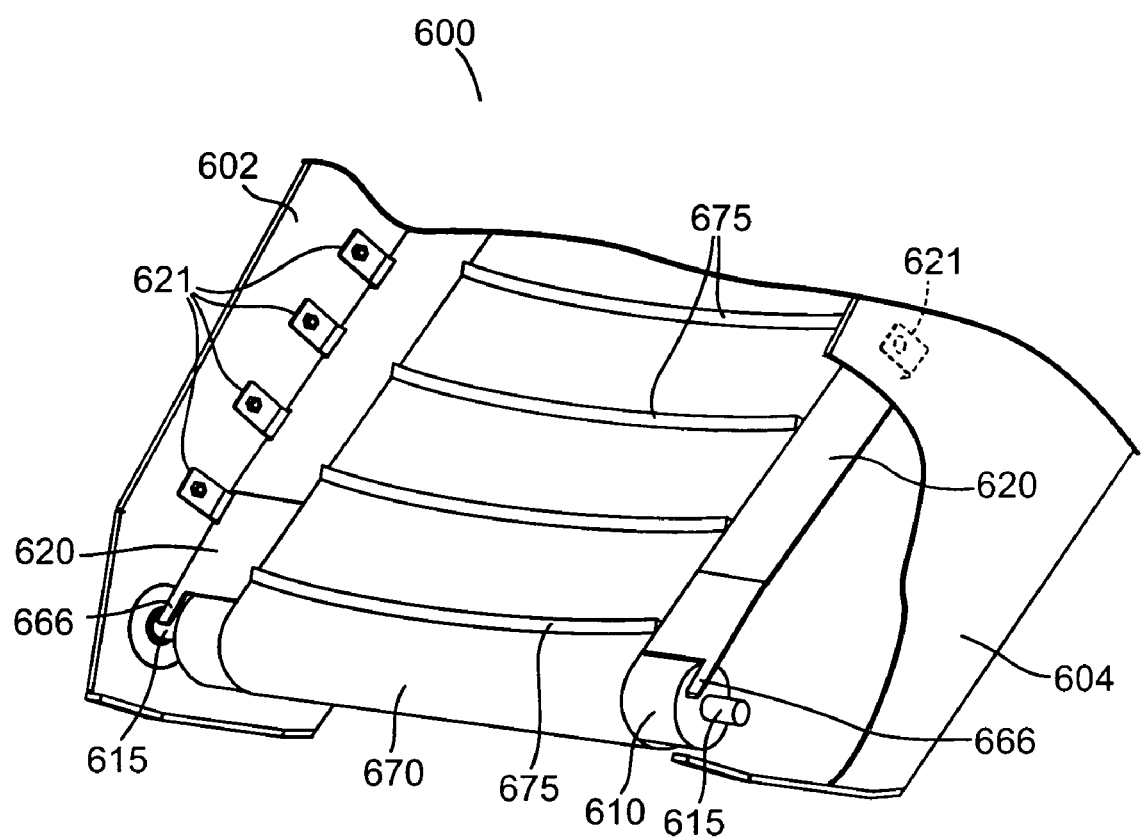
FIG. 6 is an end perspective view of the conveyor assembly illustrating the relationship between the debris skirts, roller, and conveyor belt according to an embodiment of the present invention.

FIG. 6 is an end perspective view 600 of the conveyor assembly illustrating the relationship between the debris skirts 620, roller 610, and conveyor belt 670 according to an embodiment of the present invention. In FIG. 6, debris skirts 620 have been mounted to both sidewalls 602 and 604 with brackets 621 and bolts. The debris skirts 620 are shown disposed beneath the edges of the conveyor belt 670 such that the center of the belt is disposed lower than the edges of the belt forcing the conveyor belt to be generally concave shaped across the width of the belt with a crowned center adjacent the crowned roller 610. The flights 675 also take on the concave shape of the belt 670. The debris skirts 620 are again shown provided with extension flanges 666 to cover and protect the axle 615, roller 610, and bearing interfaces.

Figure 6A:
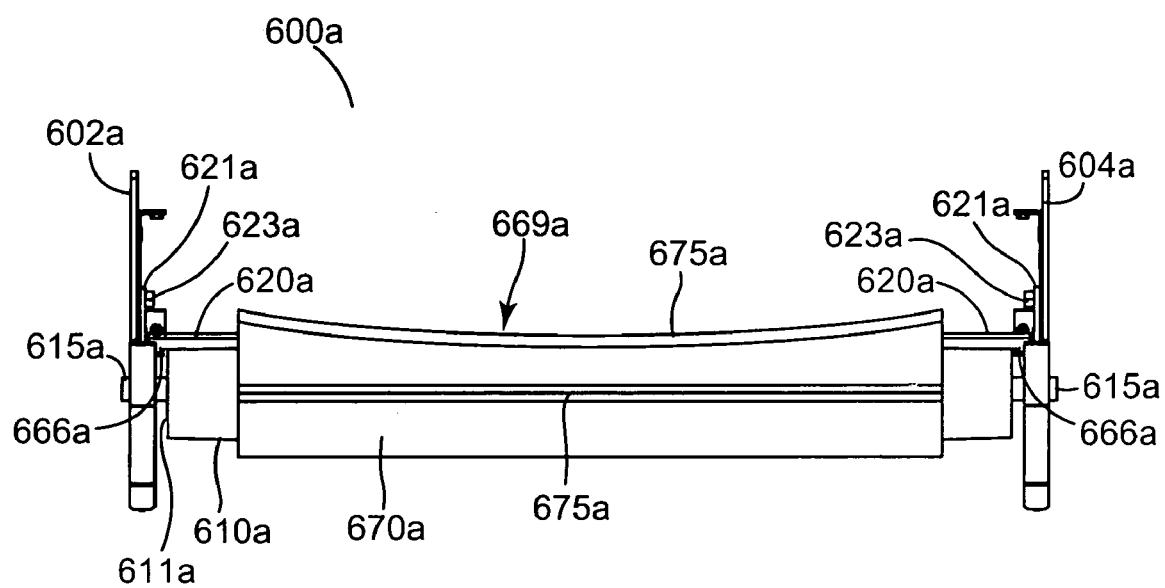
FIGS. 6a and 6b are an ends view of the conveyor assembly illustrating the concave curvature imposed on the conveyor belt by the debris skirts according to an embodiment of the present invention with FIG. 6b showing the configuration with a crowned roller.

FIG. 6a is an end view 600a of the conveyor assembly illustrating the concave curvature imposed on the conveyor belt 670a by the debris skirts 620a and illustrating the relationship between the debris skirts 620a, roller 610a, and conveyor belt 670a according to an embodiment of the present invention. In FIG. 6a, debris skirts 620a have been mounted to both sidewalls 602a and 604a with brackets 621a and bolts 623a. The debris skirts 620a are shown disposed beneath the edges of the conveyor belt 670a such that the center 669a of the belt is disposed lower than the edges of the belt 670a forcing the conveyor belt 670a to be generally concave shaped across the width of the belt 670a. The flights 675a also take on the concave shape of the belt 670a in the region where the belt is formed into the concave shape. The debris skirts 620a are again shown provided with extension flanges 666a to cover and protect the axle 615a, roller 610a, and bearing interfaces.

Figure 7:
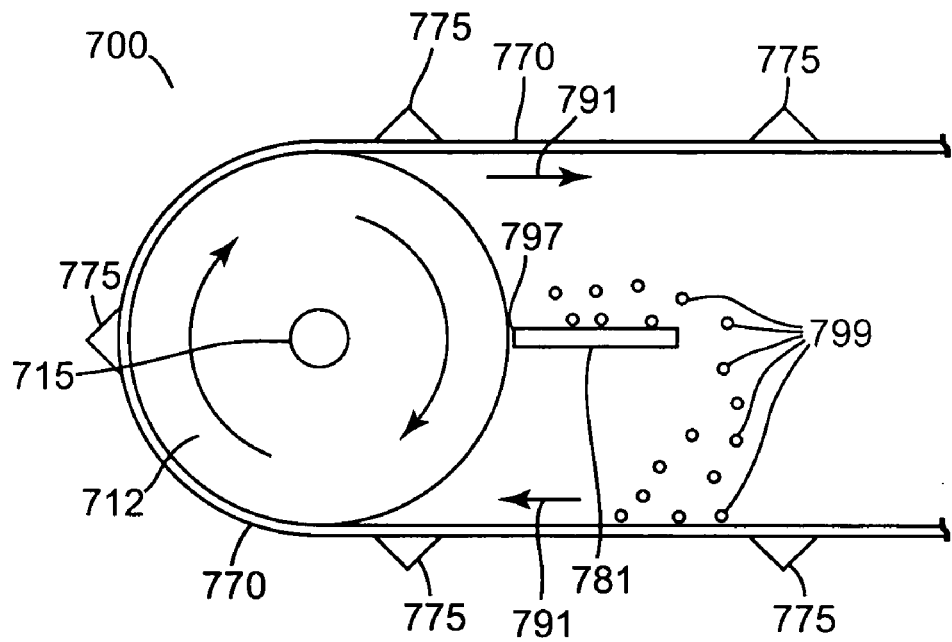
FIG. 7 illustrates a prior art roller scraper for removing debris from a roller.

FIG. 7 is a side view 700 illustrating a prior art roller scraper 781 removing debris particles 799 from the roller 712 mounted on axle 715. The prior art scraper 781 is a flat blade with a scraping surface 797 placed in close proximity to the roller 712 at a location between the conveyor belt 770 upper and lower segments, i.e., between the sides of the belt 770 opposite the flights 775. Debris accumulated on the roller 712 is scraped from the roller and falls onto the interior portion of the conveyor belt 770, and immediately is re-associated with the roller 712 in a continuous cycle as the belt 770 moves along the prescribed direction of travel 791. The debris particles 799 are not effectively removed from the conveyor assembly but rather are recycled within the assembly.

Figure 8:
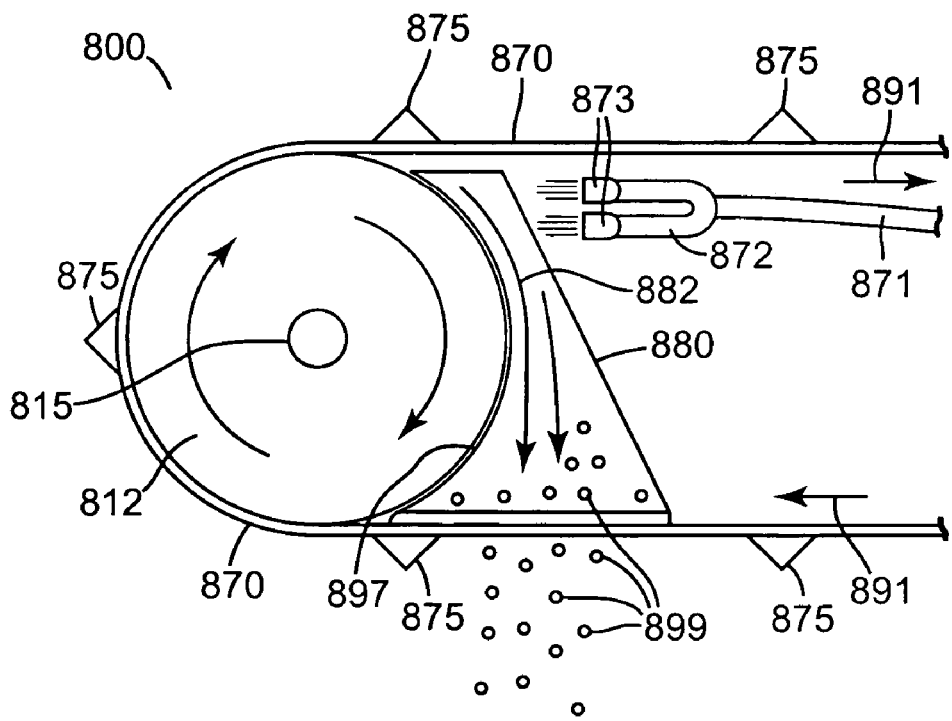
FIG. 8 illustrates the roller scraper removing debris from the roller and enveloping at least a portion of the roller and a liquid dispensing apparatus for cleaning the roller and directing the debris toward the exterior of the conveyor belt according to an embodiment of the present invention.

FIG. 8 is a side view 800 illustrating the roller scraper 880 removing debris particles 899 from the roller 812 mounted on axle 815 and enveloping at least a portion of the roller 812 and a liquid dispensing apparatus 871, 872, and 873 for cleaning the roller 812 and directing the debris particles 899 toward the exterior of the conveyor belt 870 according to an embodiment of the present invention. The roller scraper 880 is provided with a scraping surface 897. The scraping surface may be flat or serrated as desired. The scraping surface is arcuately shaped to conform with the shape of the roller when placed in proximity thereto.

The debris particles 899 are directed away from the center of the interior space between the upper and lower belt segments by a sloping surface 882. The scraper 880 is higher at the portion where the scraper lies adjacent to the center of the roller 812 and slopes gently down toward the outer ends of the roller 812. Thus, the debris particles 899 are directed out of the interior of the conveyor assembly by gravity down the sloping sides of the scraper 880 and by the curved arcuate shape of the scraping surface 897.

The scraper 880 may be optimized by adjusting the spacing between the scraping surface 897 of the scraper 880 and the outer surface of the roller 812 and the slope of sloping sides of the scraper 880. The scraper's 880 overall shape is preferably a sloped chevron shaped but may also be other shapes as desired. The scraper 880 may also be optimized by maximizing the roller runout, i.e., the amount of the roller that is enveloped by the scraper.

The roller runout is based on the limitations of the size of the interior space between the upper and lower segments of the conveyor belt. The interior space is based upon the diameter of the roller. By providing the scraper surface being arcuate and curved to maintain a predetermined spacing between the roller surface and the scraping surface and the entire length of the scraping surface, debris is removed from the interior portion of the conveyor assembly. The scraper may be fabricated from a hardened steel such as Domex™ steel or other wear hardened metals.

The conveyor assembly may also be provided with a liquid or solvent dispensing apparatus. A hose 871 may be disposed in close proximity to the interface between the scraper 880 and roller 812 to deliver water, detergent, or some other solvent to the roller. The solvent may be adapted to remove difficult gummy substances which would merely be smeared over the roller and not removed therefrom. The hose 871 may be joined by at least one spout 872. The spout may ideally be provided with a nozzle to disperse the solvent evenly across the roller and provide the solvent with a pressurized delivery. Preferably, the liquid delivery apparatus would be provided with a sufficient number of spouts and nozzles to completely and evenly cover the entire width of the roller with solvent nearly simultaneously.

Figure 9:
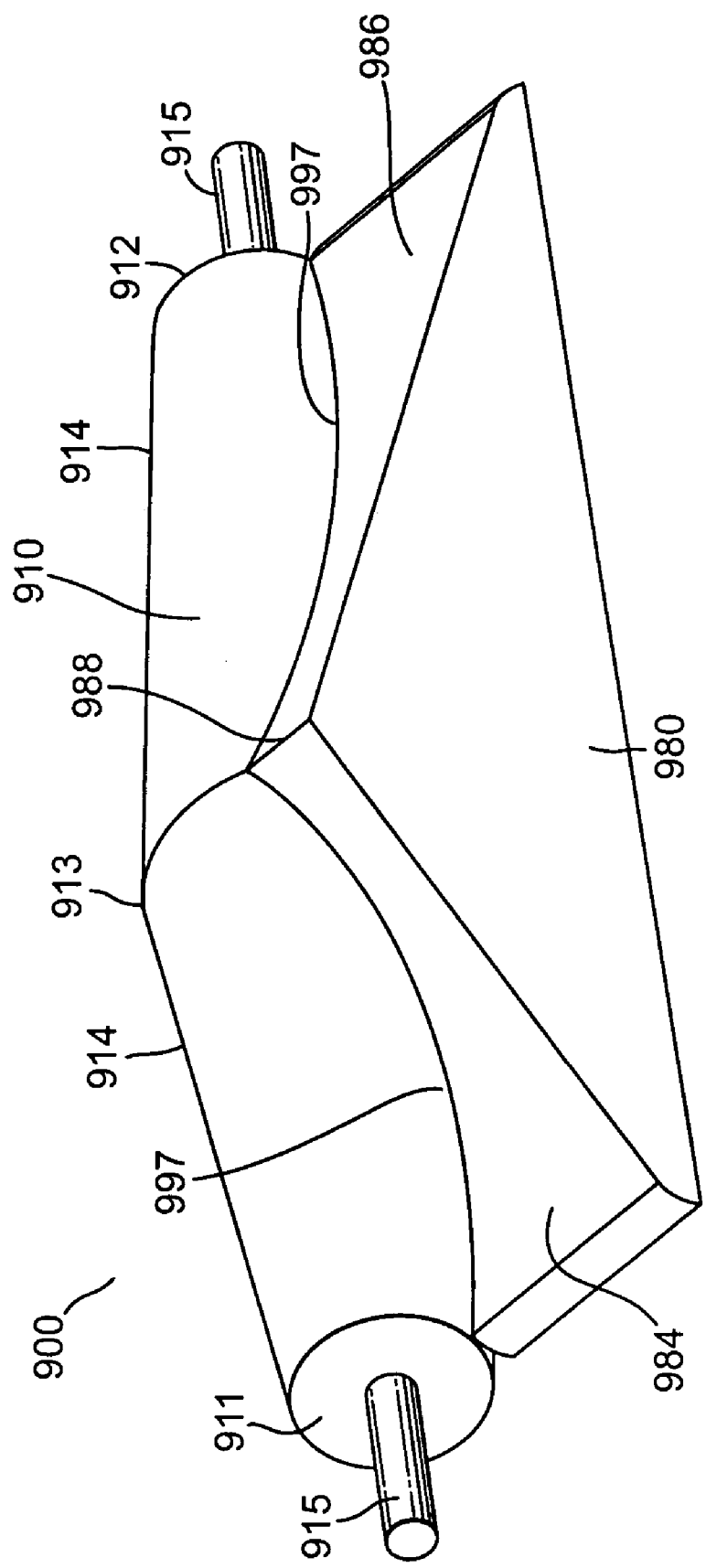
FIG. 9 is a perspective view illustrating the relationship between the roller and the roller scraper according to an embodiment of the present invention.

FIG. 9 is a perspective view 900 illustrating the relationship between the roller 910 and the roller scraper 980 according to an embodiment of the present invention. In FIG. 9, the roller 910 is mounted on axle 915 at ends 911 and 912. The axle establishes a central axis of rotation for the roller and lies in a horizontal plane generally parallel to the plane of the conveyor belt. The ridge 988 of the scraper 980 is preferably a chevron shape and is configured to approach the crown 913 of the crowned portion of the roller and lie adjacent the crown 913 preferably without touching. The scraping surfaces 997 on each side 984, 986 of the scraper 980 are configured arcuately curved in order to maintain spacing between the scraping surface 997 and the roller 910 from the crown 913 of the roller 910 out to the apex or edge where the roller surface meets the roller ends 911, 912 and envelop the roller 910 adjacent to the sloping sides 914 of the roller 910. Debris scraped from the roller 910 by the scraper 980 is directed away from the center of the roller to the exterior ends of the roller by both the acceleration of gravity by the curved sloping shape of the roller scraper 980.

Figure 10:
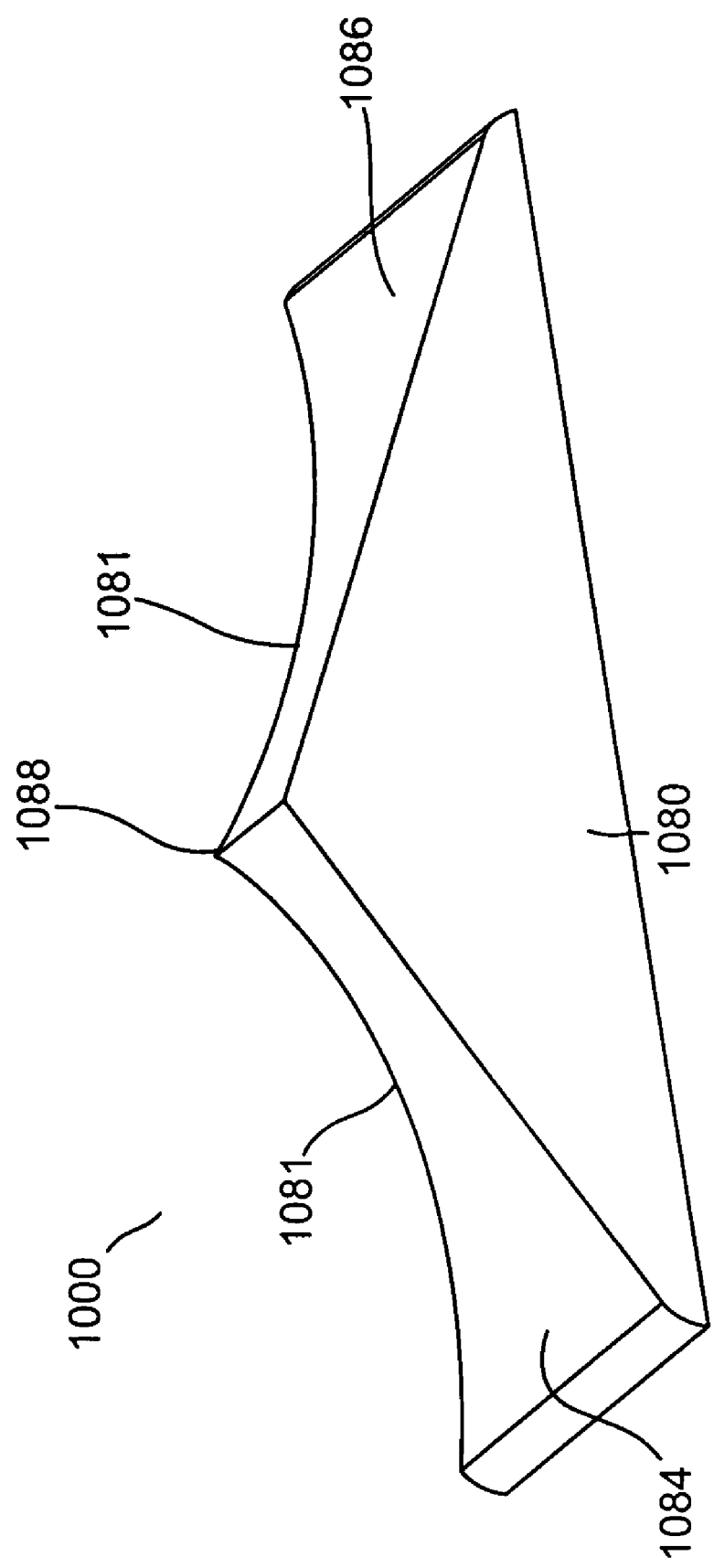
FIG. 10 illustrates the roller scraper according to an embodiment of the present invention.

FIG. 10 is a perspective view 1000 illustrating the roller scraper 1080 according to an embodiment of the present invention. In FIG. 10, the roller scraper 1080 is shown having a ridge portion 1088, a pair of scraping surfaces 1081 extending along sloping sides 1084 and 1086 of the roller scraper. The ridge portion may be configured to be further upstream of the scraper portions 1081. That is, the ridge may extend circumferentially around the roller generally along the crown point 913 (FIG. 9) and the leading edge of the scraper 1081 will preferably follow a slightly arcuate path from the ridge to the sides 1084. In effect, the scraper will preferably follow an arc which wraps around the roller (envelopes) as it tails out toward the ends 1084. This provides a smooth path for debris to be removed. In the alternative, the path may be straight. In the preferred case, the width of the scraper is greater at the ends 1084 than at the ridge. The scraper roller 1080 may be configured to extend across the entire width of a roller or may be used in a plural scraper configuration on a long roller having a plurality of conveyor belts disposed thereon.

Figure 11:
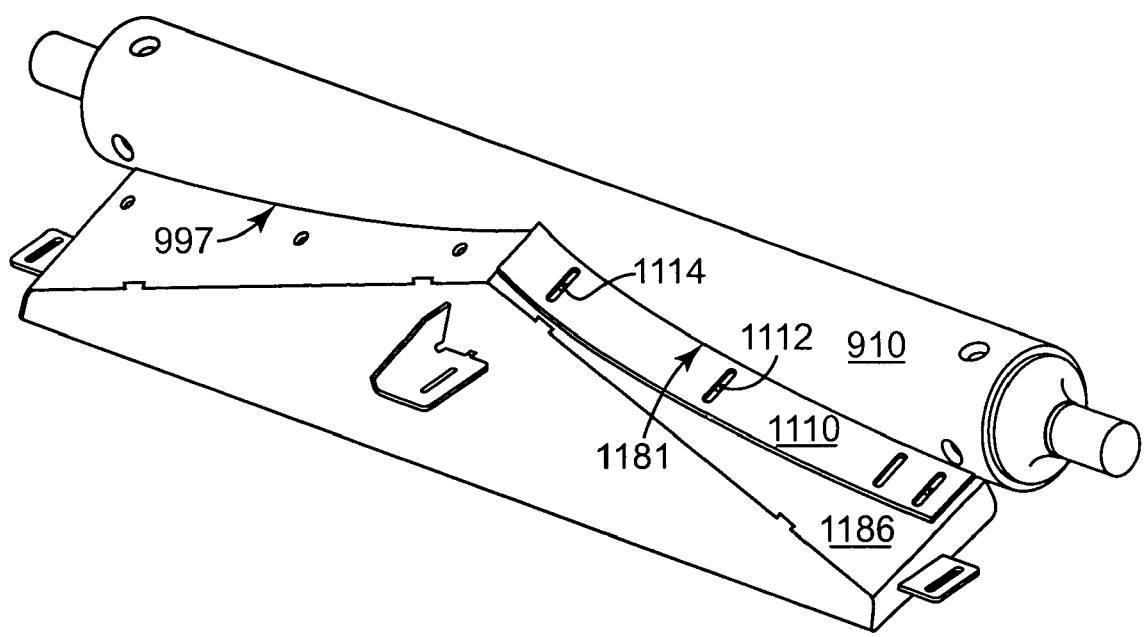
FIG. 11 is a top perspective view of an alternative scraper.

FIG. 11 illustrates an alternative embodiment designed to permit easy replacement of the scraper blades. Removably affixed atop the blade support surface 1186, is an adjustable and replaceable blade portion 1110 (shown only on one side but in the preferred configuration, it would appear on both sides of the scraper assembly. Blade 1110 is affixed to the base 1186 via longitudinal slot which are generally perpendicular to the roller 910 but provide sufficient width to permit the blade to be skewed as desired relative to the roller. The blade is the bolted to the base 1186 with the threaded holes 1114. The preferred material for the removable blades is AR400 and the preferred spacing from the roller is 0.125 inches/3 mm. The advantage of this construction is that the base 1186 can be made of a variety of materials while the blade can me made of special hardened materials and replaced as needed. It is also possible to shape the leading edge 1181 of the blade to conform to any special curvature or crowing of the roller as needed for the circumstance.

The roller scraper may also have a crown diameter which is greater than the end diameter, and the ridge of the roller scraper which is associated with the center point of the roller and the ends of the sides of the scraper are associated with the ends of the roller.

Figure 6B:
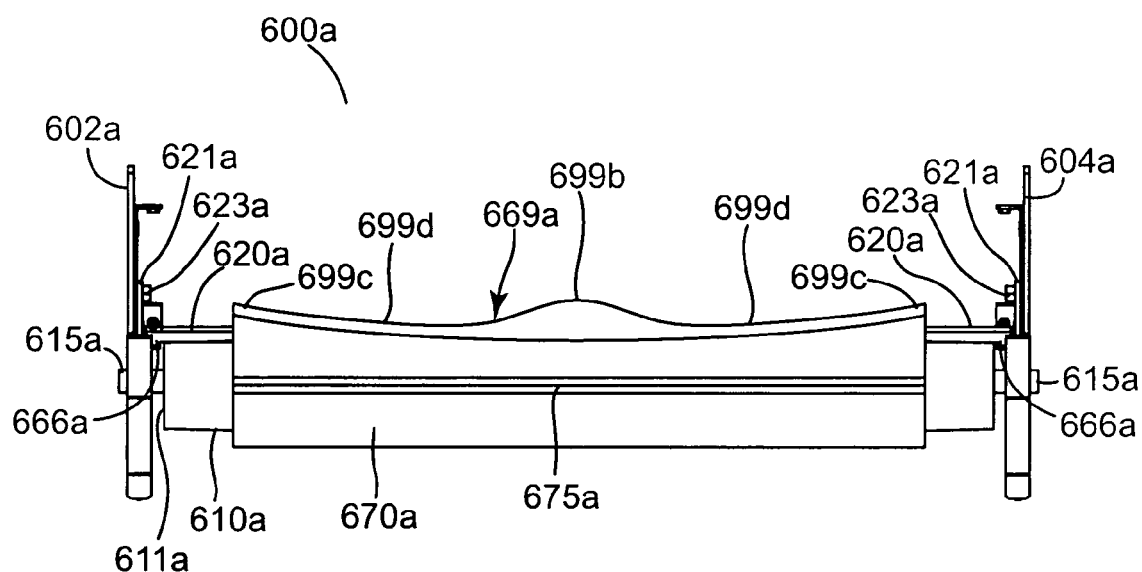

Further, it is understood that the roller scraper and the debris skirt structures may be combined or used separated as needed for the particular configuration. Therefore, if the two features are combined, the shape of the conveyor belt 675*a* in FIG. 6*b* will be altered to rise toward the center (apex 699*b*) where the roller's crown is located and at the end(s) 699*c* thereby creating two slight troughs 699*d*.

It is understood that alternate structures for the a street sweeper having a conveyor belt debris removal system may be provided without departing from the scope of the invention.

The foregoing objects, advantages and distinctions of the invention, among others, are obtained in a presently preferred construction that provides a conveyor belt debris removal system provided with an apparatus configured to form the belt into a particular shape along at least a portion of the run of the conveyor belt and a conveyor belt debris removal system provided with a cleaning mechanism for removing debris from a conveyor belt roller disposed at ends of the conveyor belt apparatus.

The foregoing description of an exemplary embodiment of the invention has been presented for the purpose of illustration and description. It is not intended to be exhaustive or to limit the invention to the precise form disclosed. Many modifications and variations are possible in light of the above teaching. It is intended that the scope of the invention be limited not with this detaned description, but rather by the claims appended hereto.

What is claimed is:

1. A conveyor assembly having peripheral sidewalls, the assembly comprising:
   a first driving roller;
   a second roller mounted on an axle having an associated bearing assembly at each end of the axle;
   a conveyor belt having opposing edges and top and underside surfaces, said, the belt being operatively connected to the driving roller and the second roller and defining a gap between one of the sidewalls and belt; and
   at least one non-moving debris skirt associated with an edge of the conveyor belt, wherein the debris skirt extending from one of said sidewall and being positioned to lift the edge of the conveyor belt, thereby causing the conveyor belt to follow a concave orientation, and;
   wherein a portion of said non-moving skirt overlies a portion of one of said rollers and its axles, thereby preventing debris from accumulating on the underside of the belt via the gap adjacent one of the rollers and its axles and
   wherein the at least one debris skirt further comprises a pair of debris skirts extending from said sidewalls, each debris skirt associated with opposing edges of the conveyor belt adjacent to the second roller and;
   wherein each debris skirt further comprises an extension flange substantially covering at least part of the ends of the axle and the associated bearing assemblies, and;
   further comprising a plurality of spaced apart rub rails associated with each debris skirt, wherein the debris skirt and associated rub rail cooperatively provide a low friction gliding surface and form a dynamic seal with the conveyor belt along the edges of the conveyor belt and cooperatively lift the conveyor belt edges along a length of the conveyor belt to deflect the edges of the belt to form a concave shape; and
   wherein the rub rail and the debris skirt are associated via a mitered joint.

2. The conveyor of claim 1,
   further comprising a roller scraper associated with a roller, wherein the roller scraper envelops at least a portion of the roller and;
   wherein the roller scraper further comprises a pair of sloping sides extending from the ridge to outer edges of the roller scraper and following a rollout of the second roller to direct debris away from the second roller and the conveyor belt.

3. The conveyor of claim 2 wherein said scraper includes an adjustable blade portion.

4. A conveyor assembly having peripheral sidewalls, the assembly comprising:
   a first driving roller;
   a second roller mounted on an axle having an associated bearing assembly at each end of the axle;
   a conveyor belt having opposing edges and top and underside surfaces, said, the belt being operatively connected to the driving roller and the second roller and defining a gap between one of the sidewalls and belt; and
   at least one non-moving debris skirt associated with an edge of the conveyor belt, wherein the debris skirt extending from one of said sidewall; and being positioned to lift the edge of the conveyor belt, thereby causing the conveyor belt to follow a concave orientation, and;
   wherein a portion of said non-moving skirt overlies a portion of one of said rollers and its axles, thereby preventing debris from accumulating on the underside of the belt via the gap adjacent one of the rollers and its axles; and
   further comprising a roller scraper associated with a roller, wherein the roller scraper envelops; and
   wherein the roller scraper further comprises a scraping surface spaced a predetermined distance from a surface of the roller along the roller; and
   wherein second roller is crowned at a center point of the roller and the roller scraper further comprises a centrally located ridge associated with the crowned center point of the second roller.

5. A conveyor assembly comprising:
   a roller mounted on an axle having an associated bearing assembly at each end of the axle;
   a conveyor belt operatively connected to the roller; and
   a pair of opposing debris skirts associated with each edge of the conveyor belt, and a plurality of spaced apart rub rails for supporting said belt, said rails also being spaced from each other and wherein the debris skirts lift the edge of the conveyor belt forming the conveyor belt into a concave orientation and where said belt is suspended between said skirt and said rub rails so that a dynamic seal between said belt, said axles and said skirt prevent debris from getting to the underside of the belt; and further comprising a roller scraper associated with the roller, wherein the roller scraper envelops at least a portion of the roller; and wherein the roller scraper further comprises a scraping surface spaced a predetermined distance from a surface of the roller along an entire extent of the roller; and wherein roller is crowned at a center point of the roller and the roller scraper further comprises a centrally located ridge associated with the crowned center point of the roller.

6. The conveyor assembly of claim 5, wherein the rub rail and the debris skirt are associated via a mitered connection.

7. The conveyor assembly of claim 5, wherein the roller scraper further comprises a pair of sloping sides extending from the ridge to outer edges of the roller scraper and following a rollout of the roller to direct debris away from the roller and the conveyor belt.

8. The conveyor assembly of claim 7, further comprising a liquid delivery assembly associated with the roller and the roller scraper, wherein the liquid delivery assembly comprises a hose, at least one spout, and a nozzle associated with each at least one spout.

9. A debris skirt for use with a conveyor belt comprising:
at least one connector disposed along a side of the skirt;
an extension flange disposed along a first end;
a mitered section disposed at a second end; and
a convex central portion of a conveyor belt, wherein the skirt is adapted to lift an edge of a conveyor belt and provide a dynamic seal between the belt and the skirt.

10. The debris skirt of claim 9, wherein the debris skirt is adapted to be connected to a rub rail at the mitered section, wherein the skirt and rub rail cooperatively lift the edge of the conveyor belt and provide a dynamic seal between the skirt and rub rail along a length of the conveyor belt.

11. A method of preventing debris from traveling over an edge of a conveyor belt, the method comprising:

lifting the peripheral edges of the belt with a lifting skirt; and abutting the lifting skirt into engagement with a bottom edge of the conveyor belt such that the edge of the conveyor belt is lifted into a concave orientation directing a flow of debris from the flange to a place away from the belt, wherein debris is directed toward a center of the conveyor belt and prevented from traveling over the edge of the conveyor belt, and wherein flange abutment prevents debris from being associated with the underside surface of the belt; and connecting a rub rail extension to an end of the skirt via a mitered connection; and forming a dynamic seal between the connected skirt and rub rail and the conveyor belt along a length of the conveyor belt.

* * * * *